US010836425B2

(12) United States Patent
Yamazaki et al.

(10) Patent No.: US 10,836,425 B2
(45) Date of Patent: Nov. 17, 2020

(54) WHEEL STEERING SYSTEM (71) Applicant: HONDA MOTOR CO., LTD., Tokyo (JP)

(72) Inventors: Ryosuke Yamazaki, Wako (JP); Takumi Inagaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 66 days.

(21) Appl. No.: 16/199,620

(22) Filed: Nov. 26, 2018

(65) Prior Publication Data
US 2019/0161114 A1 May 30, 2019

(30) Foreign Application Priority Data
Nov. 27, 2017 (JP) ................................. 2017-226656

(51) Int. Cl.
*B62D 7/16* (2006.01)
*B62D 5/00* (2006.01)
(Continued)

(52) U.S. Cl.
CPC ............. *B62D 7/16* (2013.01); *B60G 21/051* (2013.01); *B62D 5/006* (2013.01); *B62D 17/00* (2013.01);
(Continued)

(58) Field of Classification Search
CPC .......... B62D 7/16; B62D 5/006; B62D 17/00; B62D 3/02; B62D 7/22; B60G 21/051;
(Continued)

(56) References Cited

U.S. PATENT DOCUMENTS 3,711,971 A * 1/1973 Martin ................. E02F 3/64
37/417
5,511,817 A * 4/1996 Kasahara ................. B60G 3/20
267/276
(Continued)

FOREIGN PATENT DOCUMENTS

JP S60-144572 U 9/1985
JP S64-32972 A 2/1989
(Continued)

OTHER PUBLICATIONS

Translation of JP 4444281 accessed at www.espacenetcom on Mar. 25, 2020. (Year: 1987).*
(Continued)

*Primary Examiner* — Paul N Dickson
*Assistant Examiner* — Hilary L Johns
(74) *Attorney, Agent, or Firm* — Rankin, Hill & Clark LLP (57) ABSTRACT

A wheel steering system is provided that improves an environment of an actuator being mounted and reduces changes in toe angles of wheels at the time of a suspension stroke. The system includes: right and left hub carriers supported by a rear suspension mechanism; right and left tie rods having outer ends in a vehicle width direction thereof pivotally connected to the right and left hub carriers; and a Watts link having inner ends in the vehicle width direction of the right and left tie rod pivotally attached thereto so as to be pivotable about a pivot axis, wherein the actuator and the Watts link are arranged above springs, and the Watts link is connected with the actuator so as to be displaceable substantially along the vehicle width direction when a driving force of the actuator is inputted to the Watts link.

4 Claims, 6 Drawing Sheets (51) Int. Cl.
*B60G 21/05* (2006.01)
*B62D 17/00* (2006.01)
*B62D 7/22* (2006.01)
*B62D 3/02* (2006.01)

(52) U.S. Cl.
CPC ...... *B60G 2200/31* (2013.01); *B60G 2200/44* (2013.01); *B60G 2200/462* (2013.01); *B60G 2202/42* (2013.01); *B60G 2202/441* (2013.01); *B60G 2204/148* (2013.01); *B60G 2204/419* (2013.01); *B60G 2204/421* (2013.01); *B60G 2204/422* (2013.01); *B60G 2204/4222* (2013.01); *B60G 2500/40* (2013.01); *B60G 2800/962* (2013.01); *B62D 3/02* (2013.01); *B62D 7/22* (2013.01)

(58) Field of Classification Search
CPC ............ B60G 2200/31; B60G 2200/44; B60G 2200/462; B60G 2202/42; B60G 2202/441; B60G 2204/148; B60G 2204/419; B60G 2204/421; B60G 2204/422; B60G 2204/4222; B60G 2500/40; B60G 2800/962
USPC ...................................................... 280/93.51
See application file for complete search history.

(56) References Cited

U.S. PATENT DOCUMENTS

| | | | | |
|---|---|---|---|---|
| 5,813,691 A * | 9/1998 | Aoki | ................ | B60G 21/051 280/124.106 |
| 6,142,494 A * | 11/2000 | Higuchi | ................ | B60G 3/28 280/124.106 |
| 6,499,754 B1 * | 12/2002 | Heyring | ............... | B60G 21/045 280/124.106 |
| 6,631,914 B2 * | 10/2003 | Kawamura | ............... | B60G 3/24 180/381 |
| 6,666,474 B2 * | 12/2003 | Pavuk | ................. | B60G 5/00 280/124.106 |
| 7,188,850 B2 * | 3/2007 | Ziech | ..................... | B60G 9/00 280/124.125 |
| 7,229,094 B2 * | 6/2007 | Miller | ................... | B60G 5/00 280/124.107 |
| 7,270,341 B2 * | 9/2007 | Longworth | ............ | B60G 7/001 280/124.11 |
| 7,338,057 B2 * | 3/2008 | Kropfl | ................... | B60G 3/20 280/124.134 |
| 7,695,054 B2 * | 4/2010 | Haeusler | ............... | B60G 99/002 180/89.13 |
| 7,950,727 B2 * | 5/2011 | Haeusler | ............ | B62D 33/0608 296/190.07 |
| 2006/0237938 A1 * | 10/2006 | Imre | ....................... | B60G 3/24 280/124.116 |
| 2010/0052281 A1 * | 3/2010 | Bitz | ..................... | B60G 21/051 280/124.106 |
| 2010/0205806 A1 * | 8/2010 | Oprea | .................... | B60G 9/025 29/897.2 |
| 2011/0030601 A1 * | 2/2011 | Smith | .................... | B60N 2/504 114/71 |
| 2011/0095569 A1 * | 4/2011 | Haeusler | ............... | B60G 99/006 296/190.07 |
| 2011/0248464 A1 * | 10/2011 | Buhl | ................... | B60G 99/008 280/124.108 |
| 2011/0309593 A1 * | 12/2011 | Stoff | ........................ | B60G 3/20 280/124.106 |
| 2012/0098296 A1 * | 4/2012 | Lorenz | ................. | B60G 99/002 296/190.07 |
| 2012/0217715 A1 * | 8/2012 | Ehrlich | ................ | B60G 21/051 280/124.128 |
| 2012/0217716 A1 * | 8/2012 | Ehrlich | ................ | B60G 21/051 280/124.128 |
| 2012/0306176 A1 * | 12/2012 | Zandbergen | ........... | B60G 9/025 280/124.106 |
| 2013/0033018 A1 * | 2/2013 | Kiselis | .................... | B60G 9/00 280/124.116 |
| 2013/0099462 A1 * | 4/2013 | Ehrlich | ................ | B60G 21/051 280/124.116 |

FOREIGN PATENT DOCUMENTS

| | | | | |
|---|---|---|---|---|
| JP | H02-155878 A | | 6/1990 | |
| JP | H02-283574 A | | 11/1990 | |
| JP | 2006-521963 A | | 9/2006 | |
| JP | 2009-132278 A | | 6/2009 | |
| JP | 2009132278 | A * | 6/2009 | .............. B60G 7/00 |
| JP | 2010-052584 A | | 3/2010 | |
| JP | 4444281 B2 * | | 3/2010 | ............ B60G 21/051 |

OTHER PUBLICATIONS

Translation of JP 2009132278 accessed at www.espacenetcom on Mar. 25, 2020. (Year: 2009).*
Japanese Office Action with English Translation dated Jul. 2, 2019 (8 pages).

* cited by examiner

FIG. 3A
VEHICLE TRAVELING STRAIGHT

FIG. 3B
VEHICLE STEERED

FIG. 4A AT A BUMP STROKE WITH WHEELS EQUALLY DISPLACED ON THE RIGHT AND LEFT

FIG. 4B VEHICLE NOT IN MOTION

FIG. 4C AT A REBOUND STROKE WITH WHEELS EQUALLY DISPLACED ON THE RIGHT AND LEFT

FIG. 5A AT A BUMP STROKE WITH WHEELS EQUALLY DISPLACED ON THE RIGHT AND LEFT

FIG. 5B VEHICLE NOT IN MOTION

FIG. 5C AT A REBOUND STROKE WITH WHEELS EQUALLY DISPLACED ON THE RIGHT AND LEFT

WHEEL STEERING SYSTEM

CROSS-REFERENCE TO RELATED APPLICATION

This application claims the benefit of priority to Japanese Patent Application No. 2017-226656 filed 27 Nov. 2017, the disclosures of all of which are hereby incorporated by reference in their entireties.

TECHNICAL FIELD

The present invention relates to a wheel steering system that steers wheels by an actuator.

BACKGROUND OF THE INVENTION

Japanese Patent Application Publication No. 2010-052584 A (hereinbelow, referred to as Patent Document 1), as an example, discloses a wheel steering system that actively controls toe angles of rear wheels by an actuator mounted below springs of a rear suspension.

In addition, Japanese Patent Application Publication No. H02-283574 A (hereinbelow, referred to as Patent Document 2) discloses a wheel steering system that causes rear wheels to be steered toward an opposite turn direction with respect to front wheels in the case where the turning angles of the front wheels are large. In the wheel steering system disclosed in Patent Document 2, an actuator for controlling toe angles of the rear wheels is mounted on a rear sub frame above springs of a rear suspension.

SUMMARY OF THE INVENTION

Problems to be Solved

In the wheel steering system disclosed in Patent Document 1, the actuator is arranged below the springs, and this increases the unsprung weight to affect riding quality and turning performance. Additionally, in the wheel steering system disclosed in Patent Document 1, the actuator may be affected such as by stone splashing, vibration, and watering, depending on an environment of the actuator being mounted in the vicinity of the rear wheels (arrangement environment).

In addition, in the wheel steering system disclosed in Patent Document 2, vertical movements of the rear wheels at the time of a suspension stroke may cause large changes in the toe angles of the rear wheels to degrade driving stability.

The present invention has been made in view of the above-identified problems and is intended to provide a wheel steering system that improves an environment of an actuator being mounted and reduces changes in toe angles at the time of a suspension stroke.

Solution to Problem

In order to achieve the above objective, the present invention provides a wheel steering system for steering wheels by an actuator, including: a suspension mechanism that suspends the wheels; right and left hub carriers that are supported by the suspension mechanism; right and left tie rods that extend along a vehicle width direction, and have outer ends in the vehicle width direction thereof pivotally connected to the right and left hub carriers; and a Watts link that has inner ends in the vehicle width direction of the right and left tie rods pivotally attached thereto so as to be pivotable about a pivot axis, wherein the actuator and the Watts link are arranged above springs of the suspension mechanism, and the Watts link is connected with the actuator so as to be displaceable substantially along the vehicle width direction when a driving force of the actuator is inputted to the Watts link.

Advantageous Effects of the Invention

The present invention provides a wheel steering system that improves an environment of an actuator being mounted and reduces changes in the toe angles at the time of a suspension stroke.

BRIEF DESCRIPTION OF DRAWINGS

FIGS. 4A to 4C are schematic plan views, as viewed from above in the vehicle up-down direction, of the right and left rear wheels with the rear suspension device, where

FIGS. 6A to 6C are schematic perspective illustrations of the relationship between positions of the torsion axis of a torsion beam when the rear wheels are differently displaced on the right and left, where

EMBODIMENTS OF THE INVENTION

Next, embodiments of the present invention will be described in detail with reference to the drawings as appropriate.

Figure 1:
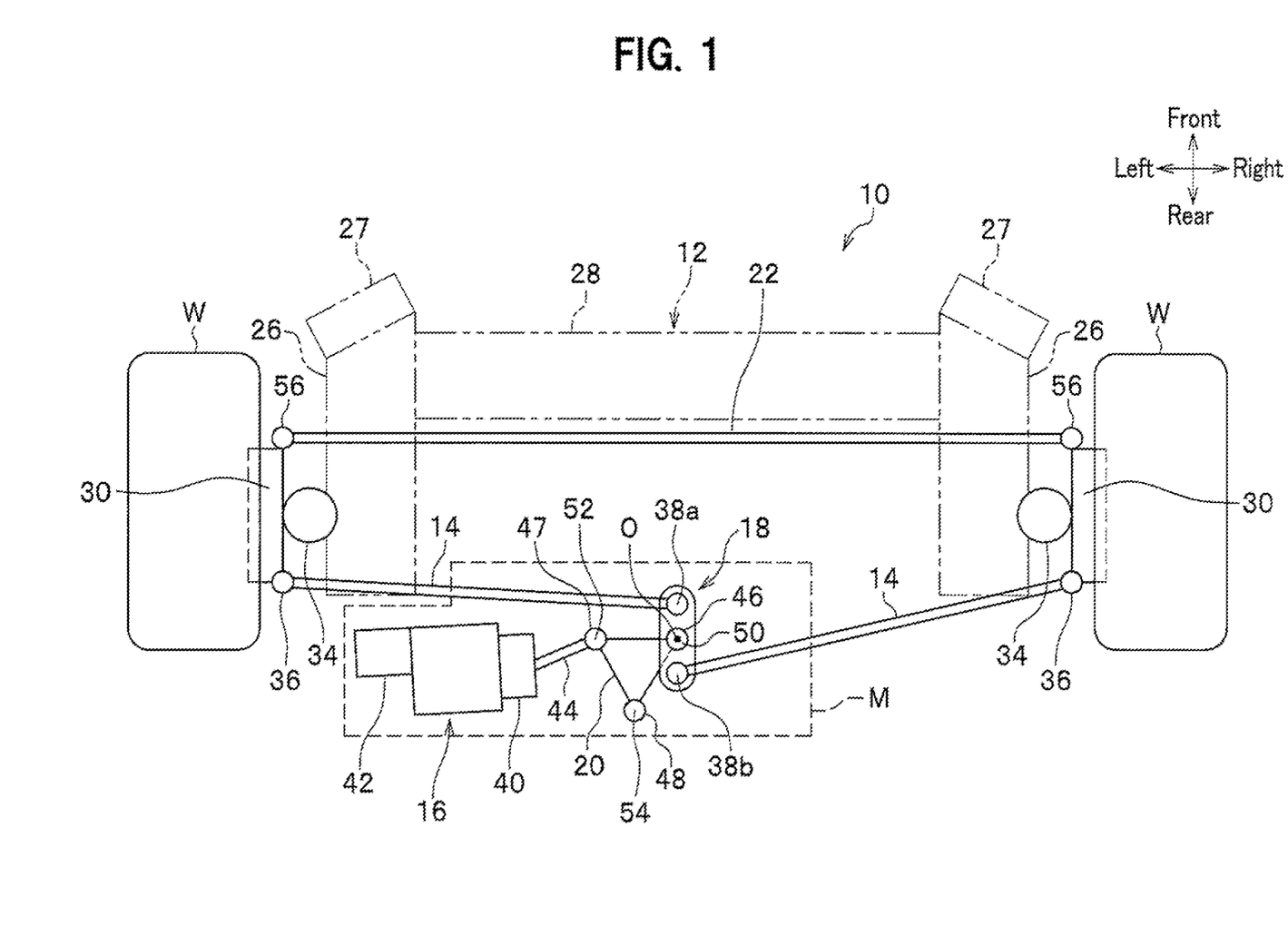
FIG. 1 is a schematic plan view, as viewed from above in a vehicle up-down direction, of right and left rear wheels to which a wheel steering system (also referred to as a rear suspension device) according to an embodiment of the present invention is applied.

FIG. 1 is a schematic plan view, as viewed from above in a vehicle up-down direction, of right and left rear wheels to which a wheel steering system (hereinbelow, referred to as a rear suspension device) according to an embodiment of the present invention is applied. Note that in each drawing, arrows "front and rear" indicate a vehicle front-rear direction, arrows "right and left" indicate a vehicle width direction (right-left direction), and arrows "up and down" indicate a vehicle up-down direction (vertical direction).

A rear suspension device 10 according to the embodiment of the present invention is applied, for example, to a vehicle (not shown) in which a front wheel drive system is adopted. As shown in FIG. 1, the rear suspension device 10 includes a rear suspension mechanism (a suspension mechanism, a torsion beam suspension mechanism) 12, right and left tie rods 14, an extension and retraction actuator 16, a Watts link 18, a rocker arm 20, and a connecting arm 22.

The extension and retraction actuator 16, the Watts link 18, and the rocker arm 20 are coupled to a lower portion of a member-for-vehicle-body 24 (see FIG. 5), for example, so as to be arranged above springs of the rear suspension mechanism 12. Note that a region M in FIG. 1 surrounded by a broken line indicates a region arranged above the springs of the rear suspension mechanism 12. A brake mechanism and the like are not shown in FIG. 1.

The rear suspension mechanism 12 is configured with a so-called H type torsion beam suspension mechanism. The rear suspension mechanism 12 includes a trailing arm 26, a torsion beam 28, a hub carrier 30, and a rubber bushing (not shown).

The trailing arms 26 are respectively disposed on right and left sides along the vehicle width direction, to extend along the vehicle front-rear direction. A torsion beam 28 extending along the vehicle width direction is integrally coupled to the right and left trailing arms 26 at the vehicle front end portions thereof and on inner sides in the vehicle width direction thereof. The right and left trailing arms 26 and the torsion beam 28 are configured to have an approximately H shape in a planar view.

The torsion beam 28 has an axially vertical cross-section in a substantially dogleg shape (or in a substantially U shape) and is formed to have a shape curved in the vehicle up-down direction (see FIG. 6B), for example. This causes the torsion beam 28 to have its torsion axis at a position deflected (deviated) from the torsion beam 28 itself due to a difference in rigidity in the vertical direction because of its axially vertical cross-sectional shape, and the curved shape. In other words, the center of the torsion (torsion axis) where the rigidity of the torsion beam 28 is balanced is at a position away from the torsion beam 28 itself.

As shown in FIG. 1, a rubber bushing (not shown) is provided at a vehicle front end portion 27 of the trailing arm 26. The vehicle front end portion 27 of the trailing arm 26 is elastically connected via the rubber bushing (not shown) to a frame member such as a vehicle body frame (not shown). A spring receiving seat (not shown), to which the lower end of a damper spring 32 (see FIGS. 5A to 5C) is attached, and a damper mount (not shown) to which a damper (not shown) is attached, are provided on the trailing arm 26 at a portion thereof closer to the rear of the vehicle and on an inner side in the vehicle width direction thereof.

As shown in FIG. 1, the hub carrier 30 is arranged for each of the right and left rear wheels W, and has an axle (wheel rotation shaft) (not shown) to rotatably support each rear wheel W. The hub carrier 30 is connected via a ball joint 34 to the trailing arm 26 at a portion thereof closer to the rear of the vehicle.

The ball joint 34 includes, for example, a male joint (movable portion) that is fixed to a part for the hub carrier 30 and has a spherical body, and a female joint (fixed portion) that is fixed to a part for the trailing arm 26 and has a sliding surface in a concave shape, inside a block body, corresponding to the spherical body. In the present embodiment, the female joint fixed to the trailing arm 26 is provided as a fixed portion, while the male joint having the spherical body is provided as a movable portion so as to be angularly displaceable.

An imaginary line (not shown) running through the ball joint 34 serves as a steering shaft. The right and left hub carriers 30 and the right and left rear wheels W are integrally rotatable in a toe-in or toe-out direction within a predetermined angular range about the steering shaft. Note that the steering of the right and left rear wheels W will be described in detail later.

The right and left tie rods 14 have different lengths from each other along the axial direction to couple the Watts link 18, which is arranged in the center in the vehicle width direction, with the hub carriers 30 which are respectively arranged at the right and left rear wheels W. That is, the outer ends in the vehicle width direction of the right and left tie rods 14 are pivotally mounted via joints 36 to the right and left hub carriers 30, respectively. In addition, the inner ends in the vehicle width direction of the right and left tie rods 14 are pivotally mounted via connecting pins 38a, 38b, respectively, to the Watts link 18. Note that the connecting pins 38a, 38b are also referred to as inner connection points 38a, 38b as will be described later. Additionally, the lengths of the right and left tie rods 14 along the axial direction depend on the arrangement position of the extention and retraction actuator 16, and may be the same or substantially the same as each other.

As shown in FIG. 1, the extension and retraction actuator 16 is integrally coupled with a speed reducer 40 and an electric motor 42 (e.g., a brush DC motor) as a rotation driver. The speed reducer 40 reduces the rotational speed of the electric motor 42, and includes a planetary gear mechanism and a cycloid, for example.

A housing for the extention and retraction actuator 16 houses a conversion mechanism that consists of a feed screw mechanism and a ball screw shaft mechanism, for example, and converts a rotational motion transmitted from the electric motor 42 into a linear motion so as to be transmitted to an output rod 44. Note that the extension and retraction actuator 16 is used as the "actuator" in the present embodiment, but the present invention is not limited thereto and a rotary actuator may be used, for example.

Figure 2A:
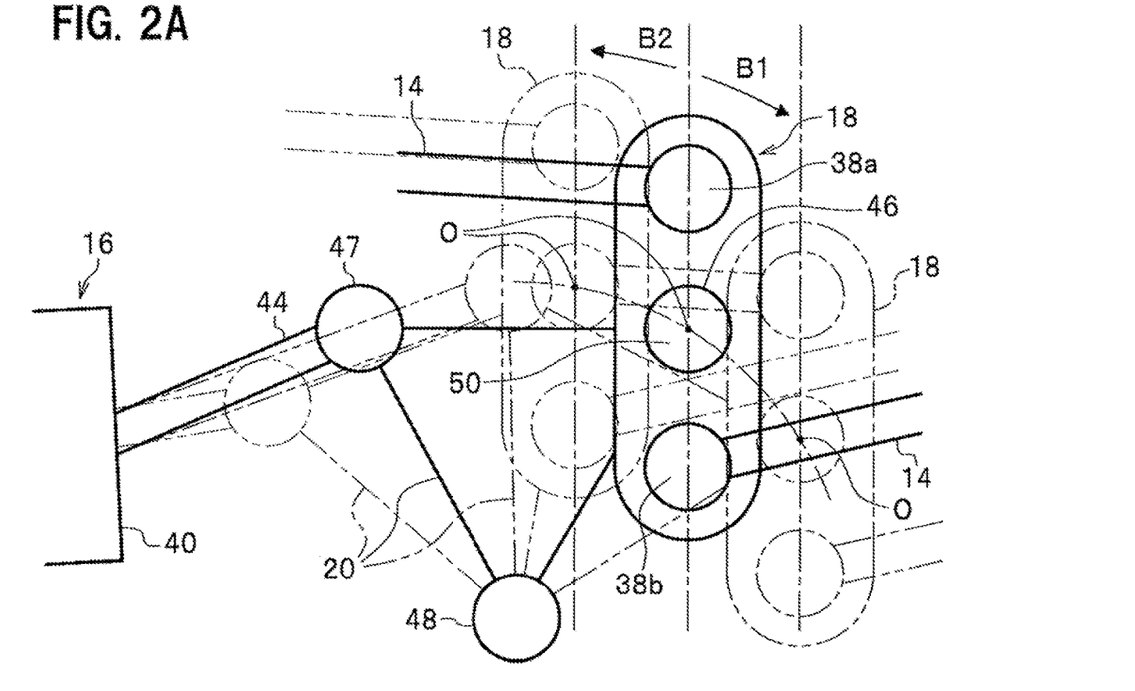
FIG. 2A is an enlarged schematic plan view of a Watts link having a displacement force of an extension and retraction actuator inputted thereto, when the actuator is in operation, to slide substantially along the vehicle width direction.
Figure 2B:
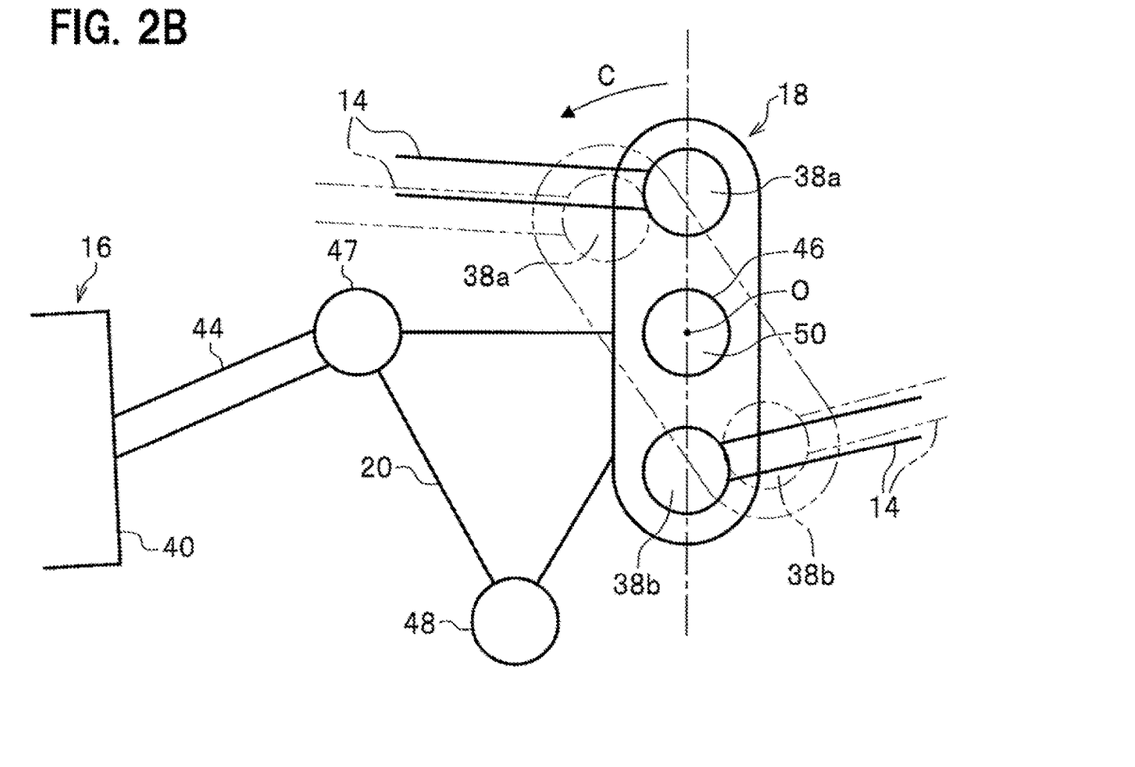
FIG. 2B is an enlarged schematic plan view of the Watts link being pivoted counterclockwise about the pivot axis, when the actuator is not in operation.

The rocker arm 20 has a substantially triangular shape in a planar view, as shown in FIGS. 1 and 2, to have three vertexes spaced equiangularly along the circumferential direction. At respective vertexes, a first movable end 46, a second movable end 47, and a fixed end 48 (pivoting fulcrum) are pivotally provided. Note that the rocker arm 20 is not limited to a substantially triangular shape in a planar view, and may have a shape like a rocker arm for opening and closing a valve of an engine, for example.

Figure 5A:
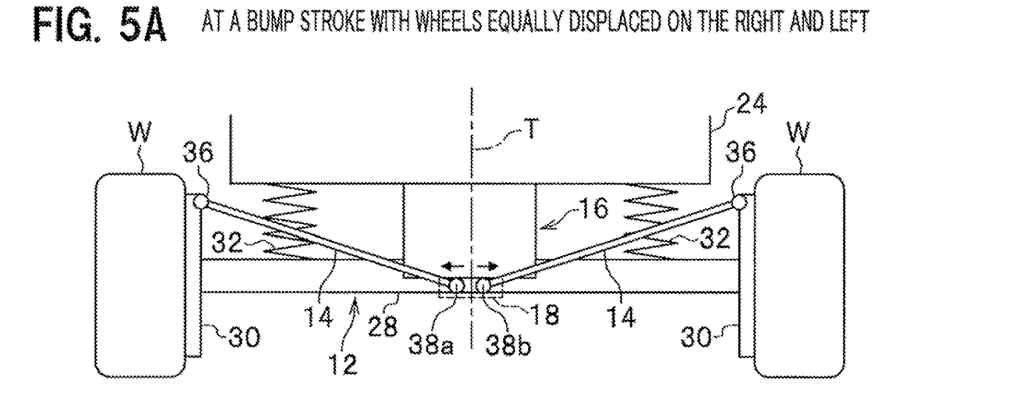
FIGS. 5A to 5C are schematic rear views, as viewed from behind in the vehicle front-rear direction, of the right and left rear wheels with the rear suspension device corresponding to those in FIGS. 4A to 4C, respectively.
Figure 5B:
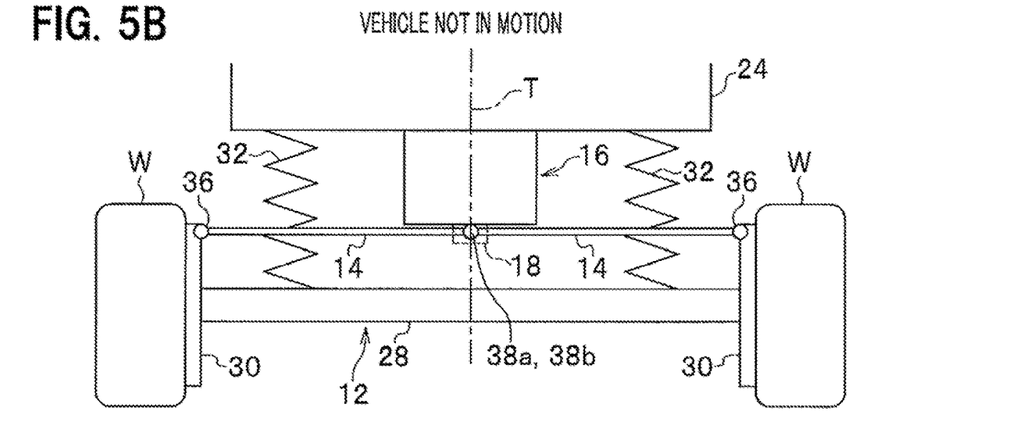
Figure 5C:
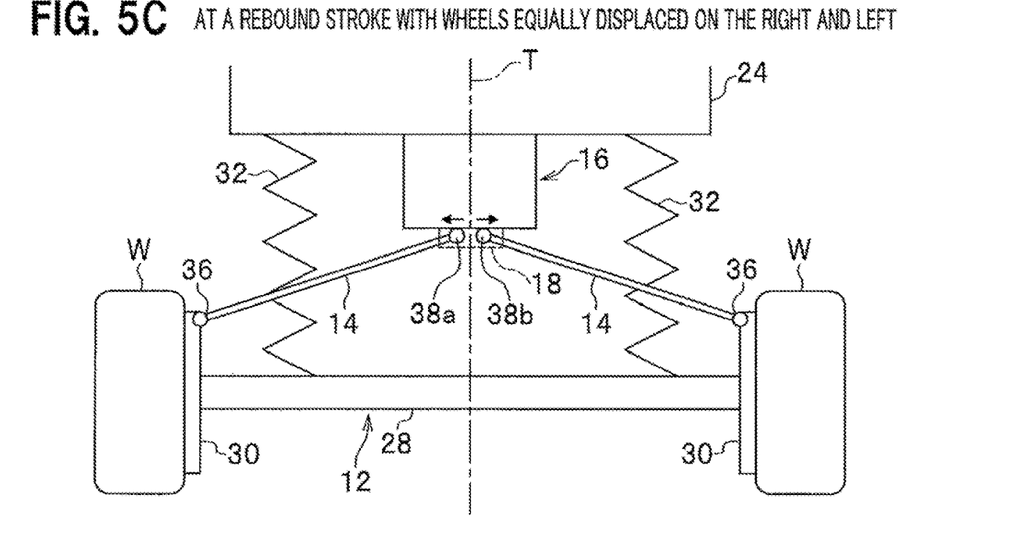

The first movable end 46 is pivotally mounted via a connecting pin 50 on a pivot axis O which is a pivot point of the Watts link 18. The second movable end 47 is pivotally mounted via a connecting pin 52 on the front end of the output rod 44 of the extension and retraction actuator 16. The fixed end 48 is fixed via a connecting pin 54 to the member-for-vehicle-body 24 (see FIG. 5) and is pivotally mounted so as to be pivotable about the fixed end 48 as a pivot point.

The rocker arm 20 is provided so as to be pivotable about the fixed end 48 as its pivot point by a predetermined range of angle when the output rod 44 of the extension and retraction actuator 16 is moved forward and backward to input a displacement force (see FIG. 2A to be described later).

Interposing the rocker arm 20 between the extension and retraction actuator 16 and the Watts link 18 has an advantage of using leverage to slide the Watts link 18 with a small force substantially in the vehicle width direction (directions indicated by arrows B1 and B2 in FIG. 2A, as will be described later). This allows the extension and retraction actuator 16 to be reduced in size and weight. Additionally, there is an advantage that the slide amount of the Watts link 18 is made larger than the displacement amount of the output rod 44 of the extension and retraction actuator 16. Note that the rocker arm 20 may be eliminated so that the front end of the output rod 44 of the extension and retraction actuator 16 is directly connected to the pivot axis O of the Watts link 18 via the connecting pin 50.

The Watts link 18 is made of a substantially elliptical plate and is arranged so that its long axis coincides with the axis of the vehicle body (a central axis T of the vehicle body to be described later) extending along the vehicle front-rear direction, while the vehicle is travelling straight (see FIG. 3A). A pivot axis O as the pivot point of the Watts link 18 is provided in the center of the Watts link 18. The first movable end 46 of the rocker arm 20 is pivotally mounted on the pivot axis O via the connecting pin 50.

In addition, one end of the Watts link 18, which is positioned on a side of the pivot axis O closer to the front of the vehicle, has an inner end in the vehicle width direction of the left tie rod 14, which is pivotally mounted on the hub carrier 30 for the left rear wheel W, pivotally attached thereto via the connecting pin 38a.

Further, the other end of the Watts link 18, which is positioned on a side of the pivot axis O closer to the rear of the vehicle, has an inner end in the vehicle width direction of the right tie rod 14, which is pivotally mounted on the hub carrier 30 for the right rear wheel W, pivotally attached thereto via the connecting pin 38b.

Note that the points, where the inner ends in the vehicle width direction of the right and left tie rods 14 are pivotally attached to the Watts link 18, are referred to as "inner connection points 38a, 38b of the right and left tie rods 14." The inner connection points 38a, 38b mean that they are located at a distance from the pivot axis O, and the distance is appropriately set.

FIG. 2A is an enlarged schematic plan view of the Watts link having a displacement force of the extension and retraction actuator inputted thereto, when the actuator is in operation, to slide substantially along the vehicle width direction, while FIG. 2B is an enlarged schematic plan view of the Watts link being pivoted counterclockwise about the pivot axis, when the actuator is not in operation.

The Watts link 18 is arranged to displace (slide) together with the rocker arm 20 along the substantially vehicle width direction, when the output rod 44 of the extension and retraction actuator 16 is moved forward and backward to transmit its displacement force to the Watts link 18 via the rocker arm 20.

As shown in FIG. 2A, when the electric motor 42 is driven to extend the output rod 44 of the extension and retraction actuator 16, for example, the rocker arm 20 is pivoted clockwise by a predetermined angle about the fixed end 48 as a pivot point. This causes the Watts link 18 to slide from the initial position toward a direction indicated by the arrow B1 substantially along the vehicle width direction. In contrast, when the output rod 44 of the extension and retraction actuator 16 is retracted contrary to the above case, the rocker arm 20 is pivoted counterclockwise about the fixed end 48 as a pivot point. This causes the Watts link 18 to be displaced from the initial position toward a direction indicated by the arrow B2 substantially along the vehicle width direction.

As shown in FIG. 2B, when the electric motor 42 is off to have the extension and retraction actuator 16 not in operation, the Watts link 18 is pivotable counterclockwise (toward a direction indicated by an arrow C) about the pivot axis O. Note that the Watts link 18 is pivotable counterclockwise (toward the direction indicated by the arrow C) about the pivot axis O in FIG. 2B, an an example, but the present invention is not limited thereto. For instance, the Watts link 18 may be pivoted clockwise (toward a direction opposite to the direction indicated by the arrow C) depending on the arrangement of the extension and retraction actuator 16 with respect to the member-for-vehicle-body 24, or the like. This allows the Watts link 18, when the extension and retraction actuator 16 is not in operation, to be pivotable by a predetermined angle in the right and left direction (clockwise and counterclockwise) about the pivot axis O.

As shown in FIG. 1, the connecting arm (connecting beam) 22, which laterally bridges the right and left hub carriers 30 along the vehicle width direction to connect them with each other, is arranged via joints 56 at the front ends in the vehicle front-rear direction of the right and left hub carriers 30 in a planar view. An axis A2 of the connecting arm 22 extending along the vehicle width direction is set to be a straight line running through a torsion center A1 of an axle beam (see FIGS. 6A, 6C). The torsion center A1 refers to the center of the torsion (torsional stress) of the axle beam (axle) including the torsion beam 28 and the trailing arm 26, for example.

Note that the axis A2 of the connecting arm 22 may be set to fall within a range running through (superimposing) the torsion center A1 of the axle beam.

The rear suspension device 10 according to the present embodiment is basically configured as described above, and a description will be given next of its operation and advantageous effects.

First, a description will be given of a case where the electric motor 42 is rotationally driven to convert its rotational driving force into linear motion so that the output rod 44 of the extension and retraction actuator 16 is moved forward and backward to steer the right and left rear wheels W.

Figure 3A:
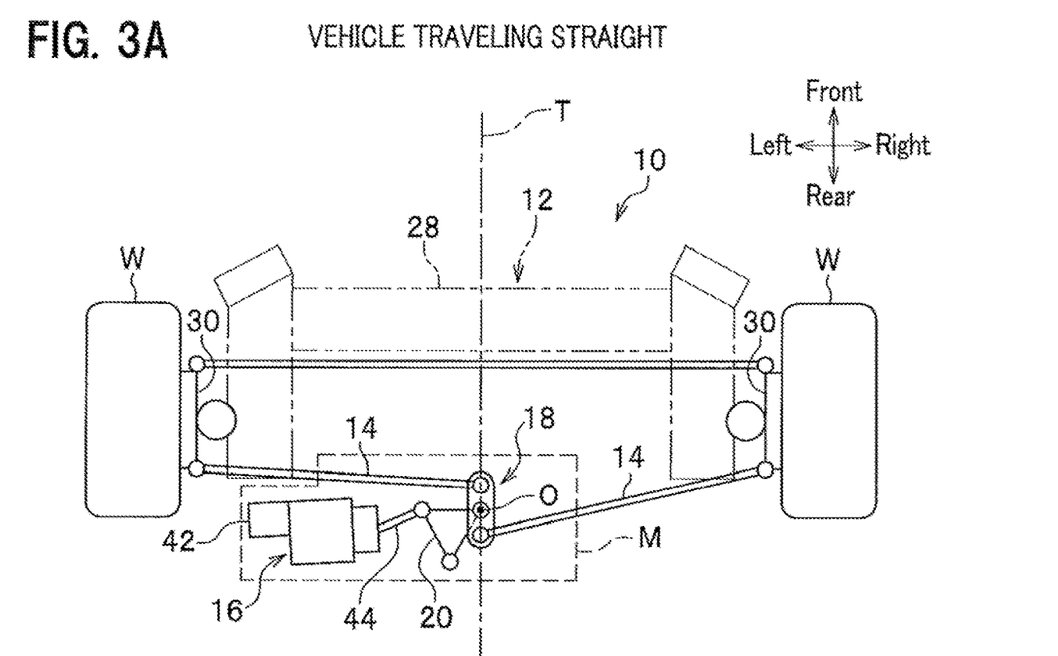
FIG. 3A is a schematic plan view of the right and left rear wheels with the rear suspension device when the vehicle is traveling straight.
Figure 3B:
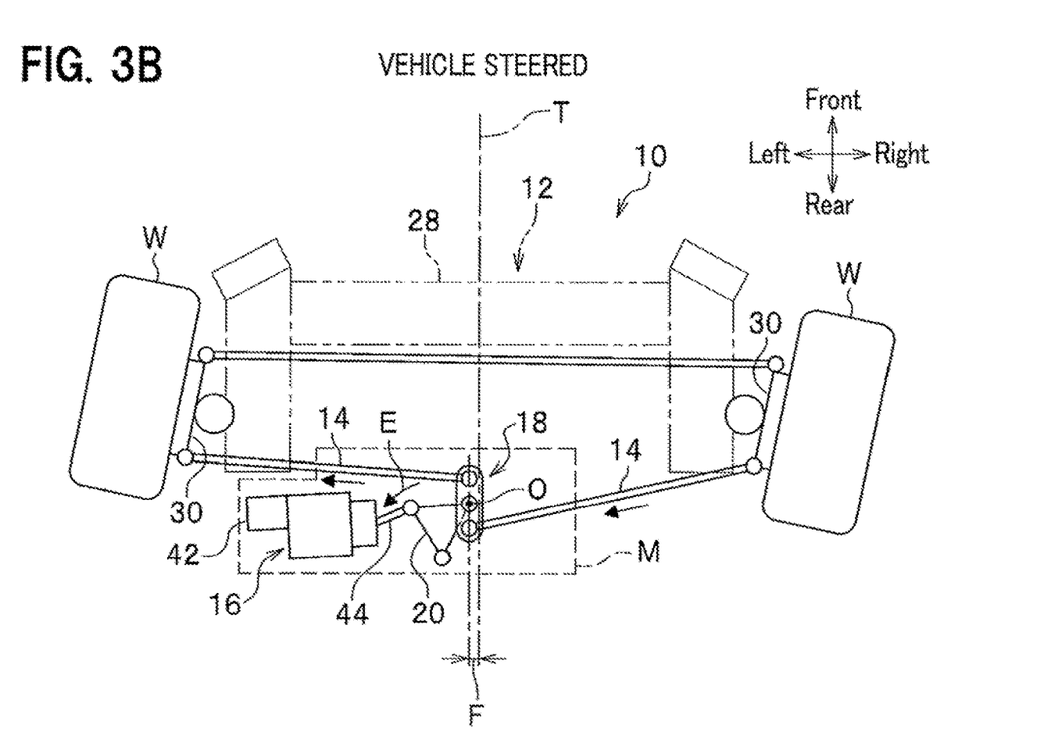
FIG. 3B is a schematic plan view of the same when the right and left rear wheels are steered while the vehicle is traveling straight.

FIG. 3A is a schematic plan view of the right and left rear wheels with the rear suspension device when the vehicle is traveling straight, and FIG. 3B is a schematic plan view of the same when the right and left rear wheels are steered while the vehicle is traveling straight.

When the vehicle is traveling straight as shown in FIG. 3A, the toe angles of the right and left rear wheels W are 0 degrees, and the long axis of the Watts link 18 is in parallel to a center axis T of the vehicle body along the vehicle front-rear direction. While the vehicle is traveling straight in this way, the electric motor 42 is driven via a controller (not shown) to displace the output rod 44 of the extension and retraction actuator 16 toward a retracting direction along the direction indicated by an arrow E (see FIG. 3B). A pull force of the output rod 44 of the extension and retraction actuator 16 makes the rocker arm 20 pivot counterclockwise by a predetermined angle about the fixed end 48 as a pivot point. This causes the Watts link 18 to slide from the initial position (when the vehicle is traveling straight) toward a direction indicated by the arrow B2 (see FIG. 2A) substantially along the vehicle width direction, as shown in FIG. 3B. Note that an arrow F in FIG. 3B indicates a slide amount (displacement amount) along the vehicle width direction of the pivot axis O of the Watts link 18 from a state of the vehicle traveling straight to a state of the vehicle being steered.

Accordingly, the right rear wheel W is steered toward the toe-out direction, while the left rear wheel W is steered toward the toe-in direction. As a result, the stability of behavior of the vehicle is improved at the time of the vehicle turning, for example, and the turning performance of the vehicle is improved.

Note that when the electric motor 42 is rotated in the reverse direction to displace the output rod 44 of the extension and retraction actuator 16 toward an extending direction, which is in the opposite direction to the direction indicated by the arrow E, the Watts link 18 slides from the initial position (when the vehicle is traveling straight) toward the direction indicated by the arrow B1 (see FIG. 2A) substantially along the vehicle width direction. This causes the right rear wheel W to be steered toward the toe-in direction and the left rear wheel W is steered toward the toe-out direction.

Next, a description will be given of a case where a load is given from the ground contact surface to the right and left rear wheels W.

Figure 4A:
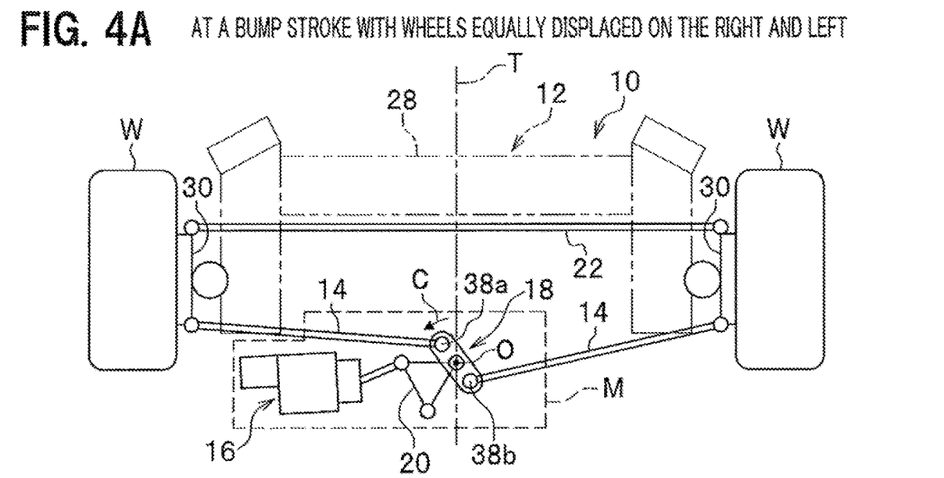
FIG. 4A shows the same at the time of a bump stroke.
Figure 4B:
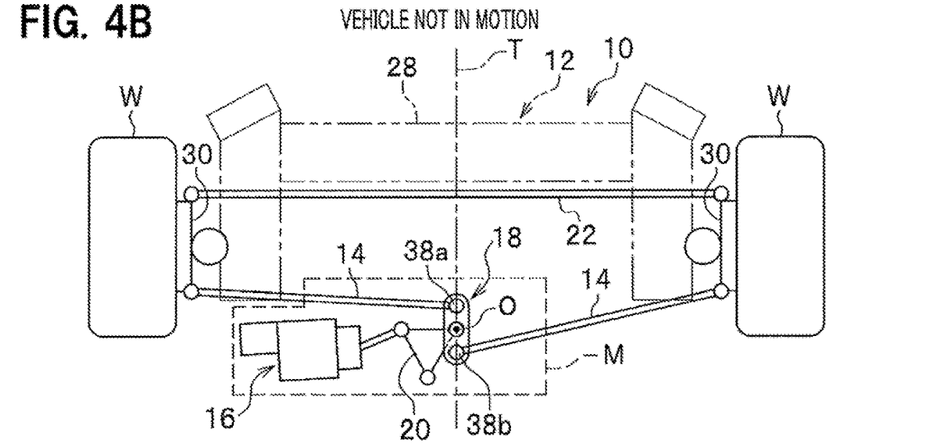
FIG. 4B shows the same when the vehicle remains still.
Figure 4C:
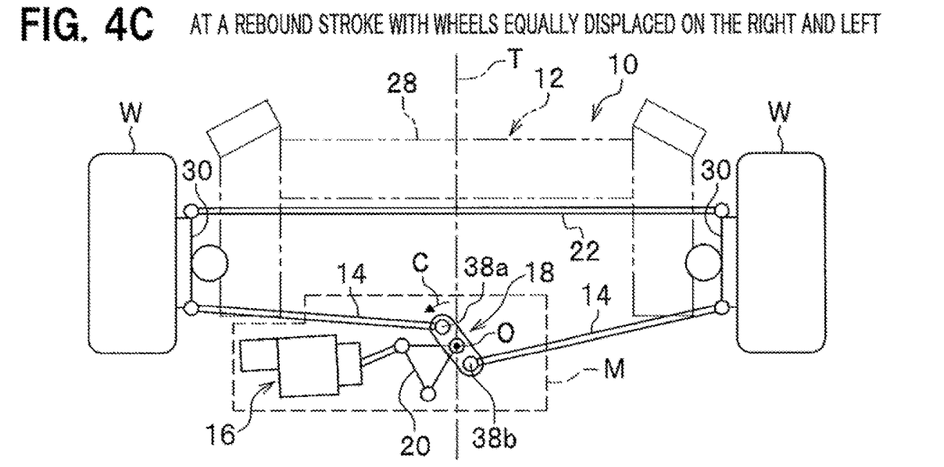
FIG. 4C shows the same at the time of a rebound stroke.

FIGS. 4A to 4C are schematic plan views, as viewed from above in the vehicle up-down direction, of the right and left rear wheels with the rear suspension device, where FIG. 4A shows the same at the time of a bump stroke, FIG. 4B shows the same when the vehicle remains still, and FIG. 4C shows the same at the time of a rebound stroke. Additionally, FIGS. 5A to 5C are schematic rear views, as viewed from behind in the vehicle front-rear direction, of the same corresponding to those in FIGS. 4A to 4C, respectively.

Note that "when the vehicle remains still" means a so-called "being under G" in which the vehicle is not in motion. In addition, "wheels equally displaced on the right and left" means that the rear wheels W are equally displaced on the right and left, when the damper springs 32 respectively arranged for the wheels are extended (at the time of a rebound stroke) or compressed (at the time of a bump stroke).

When the vehicle remains still, the long axis of the Watts link 18 coincides with the center axis T of the vehicle body, as shown in FIG. 4B. That is, the pivot axis O of the Watts link 18 and the inner connection points 38a, 38b in the vehicle width direction of the right and left tie rods 14 are aligned in a straight line, and the Watts link 18 remains still.

In contrast, at the time of a bump stroke with the wheels equally displaced on the right and left when the damper springs 32 are compressed, and at the time of a rebound stroke with the wheels equally displaced on the right and left when the damper springs 32 are extended, the Watts link 18 is pivoted clockwise (toward the direction indicated by the arrow C) about the pivot axis O by a predetermined angle. In the present embodiment, this causes the inner connection points 38a, 38b in the vehicle width direction of the right and left tie rods 14 to be changed from a state of coinciding with each other (see FIG. 5B) to a state of being separated from each other, such as shown in FIGS. 5A and 5C. The inner connection points 38a, 38b in the vehicle width direction of the right and left tie rods 14 being separated from each other outward in the vehicle width direction allows for reducing changes in the toe angles of the right and left rear wheels W to keep driving stability.

Let's assume that the Watts link 18 and the connecting arm 22 were not provided. If the right and left rear wheels W and the hub carriers 30 are pivoted toward a predetermined direction to have a desired toe angle, the hub carriers 30 also move up and down as the rear wheels W move up and down at the time of a suspension stroke. In this case, the right and left tie rods 14 (the length in the axial direction of each tie rod 14 remains constant) fail to follow the vertical movement of the hub carriers 30, with the angle (toe angle) of the hub carriers 30 being kept constant. This causes the right and left tie rods 14 to have pull forces as the hub carriers 30 move up and down, and the pull forces pivot the hub carriers 30 to change the toe angle.

In contrast, the present embodiment has the inner connection points 38a, 38b in the vehicle width direction of the right and left tie rods 14 pivotally attached to one and the other ends of the Watts link 18, to pivot the Watts link 18 clockwise or counterclockwise about the pivot axis O (see FIGS. 4A, 4C). In the present embodiment, this allows the right and left tie rods 14 to follow the up and down movements of the hub carriers 30 at the time of a suspension stroke with the rear wheels W equally displaced on the right and left, to make changes in the toe angles of the rear wheels W substantially zero.

In other words, the Watts link 18 pivots toward a predetermined direction about the pivot axis O, to supplement shortages of lengths of the right and left tie rods 14 so that the toe angles of the right and left rear wheels W are kept at 0 degrees at the time of a suspension stroke.

In addition, the present embodiment has the extension and retraction actuator 16, the rocker arm 20, and the Watts link 18 arranged above the springs. Having these components arranged above the springs allows them to be protected such as from stone splashing, vibration, chipping, and watering, as compared with having these arranged below the springs, to improve an environment of these being mounted. As a result, the present embodiment provides the rear suspension device 10 that improves an environment of the extension and retraction actuator 16 being mounted and reduces changes in the toe angles at the time of a suspension stroke.

Further, the present embodiment has the rocker arm 20, to which the front end of the output rod 44 of the extension and retraction actuator 16 is connected, connected with the Watts link 18 at the pivot axis O of the Watts link 18. This allows the Watts link 18 to be smoothly pivoted clockwise or counterclockwise about the pivot axis O, in the present embodiment. As a result, the present embodiment reduces changes in the toe angles at the time of a suspension stroke to further improve driving stability.

In other words, the present embodiment causes the Watts link 18 to be pivoted at the time of a suspension stroke to reduce passive changes in the toe angles, and allows the steering wheel to be rotated about the steering shaft to proactively change the toe angles of the right and left rear wheels W when the toe angles are actively steered, so that driving stability is improved.

Furthermore, the present embodiment has the pivot axis O of the Watts link 18 positioned in the center of the line segment connecting the fulcrum points to which the inner ends in the vehicle width direction of the right and left tie rods 14 are respectively attached (the inner connection point 38a, 38b along the vehicle width direction). If the pivot axis O of the Watts link 18 is set at a position deviated from the center of the inner connection points 38a, 38b in the vehicle width direction of the right and left tie rods 14, this may cause a difference between changes in the toe angles of the right and left rear wheels W. In contrast, the present embodiment has the center of the inner connection points 38a, 38b in the vehicle width direction of the right and left tie rods 14 set as the pivot axis O, to avoid a difference in changes in the toe angles of the right and left rear wheels W.

Next, a description will be given of a case of "differently displaced on the right and left," where the rear wheels W are differently displaced on the right and left, when the damper springs are extended or compressed.

Figure 6A:
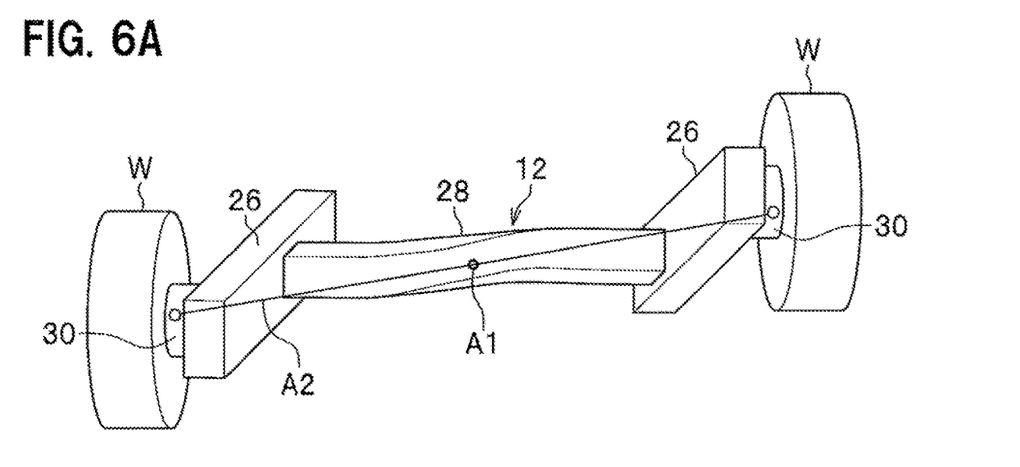
FIG. 6A shows the right rear wheel being bumped.
Figure 6B:
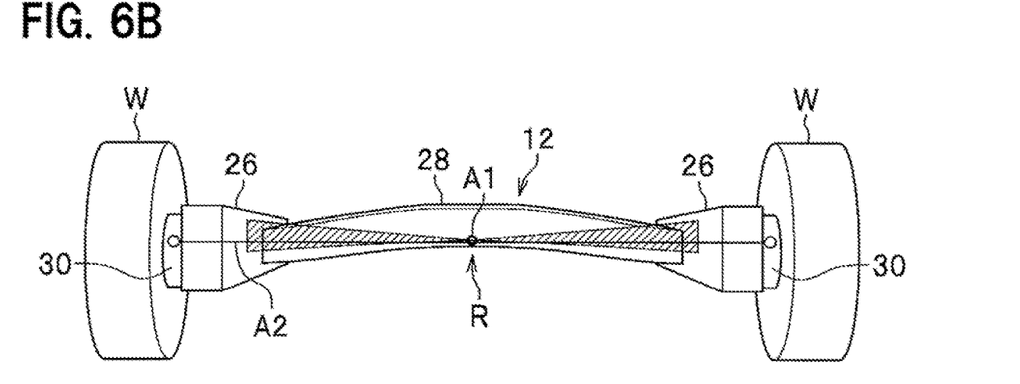
FIG. 6B shows the torsion axis of the torsion beam in FIG. 6A being superimposed on that in FIG. 6C.
Figure 6C:
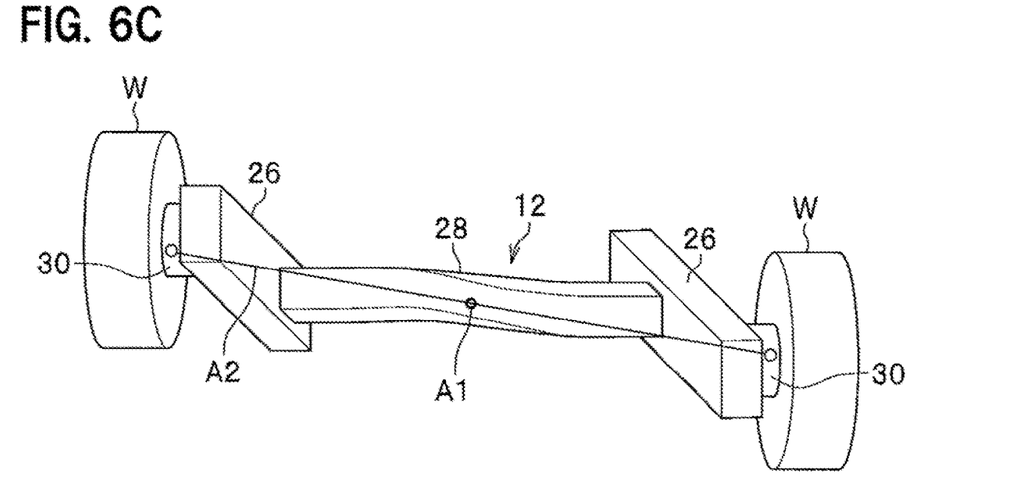
FIG. 6C shows the left rear wheel being bumped.

FIGS. 6A to 6C are schematic perspective illustrations of the relationship between positions of the torsion axis of the torsion beam when the rear wheels are differently displaced on the right and left, where FIG. 6A shows the right rear wheel being bumped, FIG. 6C shows the left rear wheel being bumped, and FIG. 6B shows the torsion axis of the torsion beam in FIG. 6A being superimposed on that in FIG. 6C. Note that in FIGS. 6A to 6C, "A1" indicates the tortion center of the axle beam, and "A2" indicates the axis of the connecting arm 22 connecting the right and left hub carriers 30 with each other along the vehicle width direction. The torsion center A1 refers to the center of the torsion (torsional stress) of the axle beam (axle) including the torsion beam 28 and the trailing arm 26, for example.

In the present embodiment, the axis A2 of the connecting arm 22 is set as a straight line running through the torsion center A1 of the axle beam including the torsion beam 28 and the trailing arm 26. When the right and left rear wheels W are displaced in opposite directions from each other (i.e., at the time of a suspension stroke with the wheels differently displaced on the right and left), for instance, as shown in FIGS. 6A and 6C, a swing of the torsion axis of the torsion beam 28 (see a slashed area in FIG. 6B) is minimal in the center in the vehicle width direction (see arrow R in FIG. 6B). In the present embodiment, the Watts link 18 is arranged in the center in the vehicle width direction where the swing of the torsion axis of the torsion beam 28 is minimal, and is provided to be pivotable about the pivot axis O. This allows the Watts link 18 to be pivoted about the pivot axis O as the hub carriers 30 are moved up and down at the time of a suspension stroke with the rear wheels W differently displaced on the right and left. As a result, the present embodiment allows the right and left tie rods 14 to follow up with the pivoting motion of the Watts links 18 at the time of a suspension stroke with the rear wheels W differently displaced on the right and left, to minimize changes in the toe angles of the rear wheels W.

Note that a description has been given in the present embodiment of a case where the rear suspension device 10 is applied to a front-wheel-drive vehicle, but the present invention is not limited thereto. For example, it may be applied to a four-wheel-drive vehicle or a rear-wheel-drive vehicle.

What is claimed is:

1. A wheel steering system for steering wheels by an actuator, comprising:

a suspension mechanism that suspends the wheels;

right and left hub carriers that are supported by the suspension mechanism;

right and left tie rods that extend along a vehicle width direction, and have outer ends in the vehicle width direction thereof pivotally connected to the right and left hub carriers;

a Watts link that has inner ends in the vehicle width direction of the right and left tie rods pivotally attached thereto so as to be pivotable about a pivot axis thereof; and a connecting beam that laterally bridges the right and left hub carriers along the vehicle width direction to connect them with each other, wherein the actuator and the Watts link are arranged above springs of the suspension mechanism, the Watts link is connected with the actuator so as to be displaceable substantially along the vehicle width direction when a driving force of the actuator is inputted to the Watts link, the suspension mechanism is a torsion-beam suspension mechanism having a torsion beam, and an axis of the connecting beam runs through a torsion center of an axle beam including the torsion beam.

2. The wheel steering system according to claim 1, wherein the Watts link is connected with the actuator at a pivot axis of the Watts link.

3. The wheel steering system according to claim 1, wherein the pivot axis of the Watts link is positioned in the center of a line segment connecting the fulcrum points to which inner ends in the vehicle width direction of the right and left tie rods are respectively attached, and the Watts link is arranged so as to be pivotable about the pivot axis at the time of a stroke of the suspension mechanism.

4. The wheel steering system according to claim 2, wherein the pivot axis of the Watts link is positioned in the center of a line segment connecting the fulcrum points to which inner ends in the vehicle width direction of the right and left tie rods are respectively attached, and the Watts link is arranged so as to be pivotable about the pivot axis at the time of a stroke of the suspension mechanism.

* * * * *